Oct. 13, 1953  H. W. NEFF  2,655,306
AIR COMPRESSOR SYSTEM
Filed April 19, 1951  3 Sheets-Sheet 2

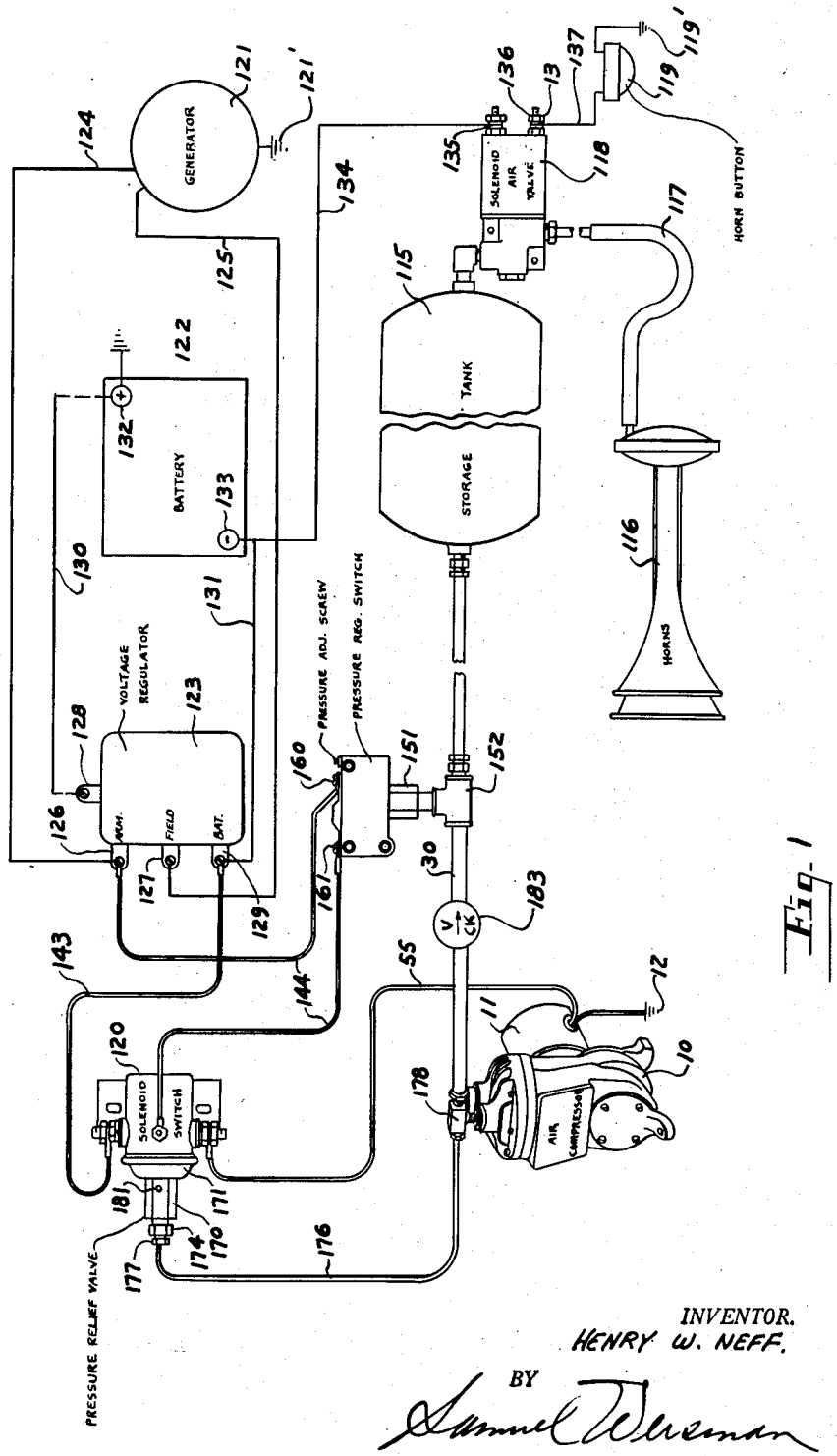

INVENTOR.
HENRY W. NEFF.
BY
Samuel Wiseman
ATTORNEY.

Oct. 13, 1953      H. W. NEFF      2,655,306
AIR COMPRESSOR SYSTEM
Filed April 19, 1951      3 Sheets-Sheet 3
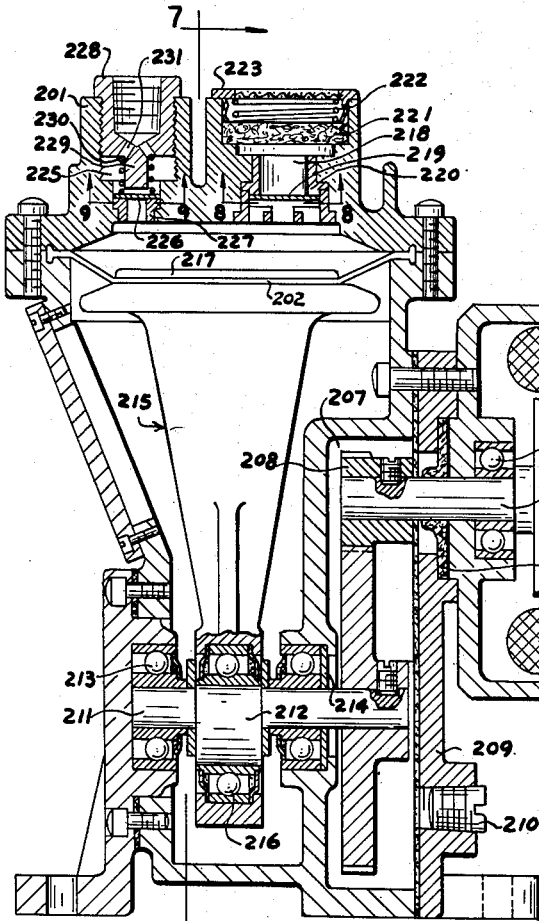
Fig. 6
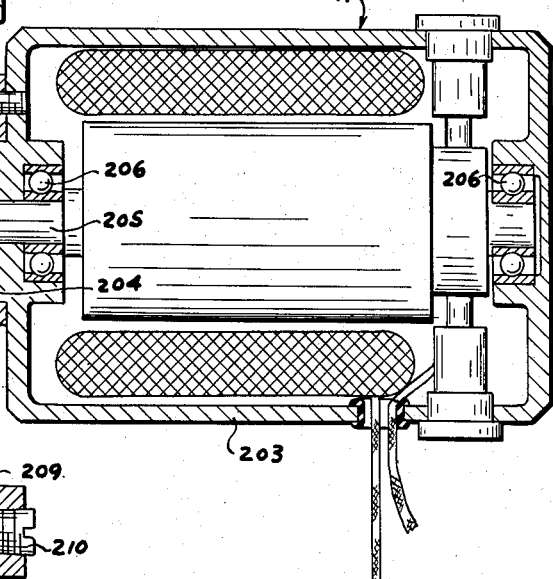
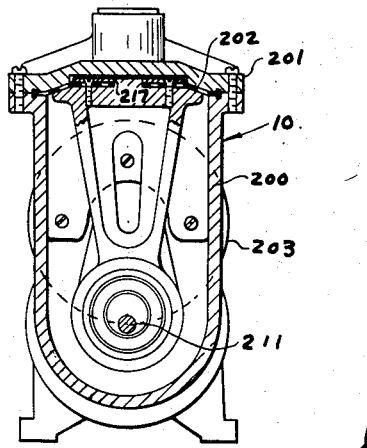
Fig. 7
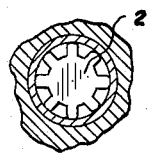
Fig. 8
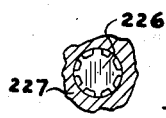
Fig. 9
INVENTOR.
HENRY W. NEFF.
BY
ATTORNEY Patented Oct. 13, 1953

2,655,306

UNITED STATES PATENT OFFICE 2,655,306

AIR COMPRESSOR SYSTEM

Henry W. Neff, Detroit, Mich., assignor to Power Brake Parts Manufacturing Company, Detroit, Mich., a corporation of Michigan Application April 19, 1951, Serial No. 221,817

4 Claims. (Cl. 230—4)

The present invention pertains to an air compressor system and embodies improvements on the apparatus shown in the copending application of Frank M. Stella, Serial No. 80,889, filed March 19, 1949 now Patent No. 2,610,235. The system is designed particularly for blowing an air horn on motor vehicles.

The system disclosed in the copending application embodies a compressor and an electric driving motor, the latter receiving current through a relay which in turn is energized and closed by the running of the generator on the vehicle. Thus, the air horn and the motor cannot exhaust an idle battery or, in other words, the battery delivers current to the driving motor only when it is being charged by the generator. A similar system is embodied in this invention which, further, provides refinements in the control of the system.

One of the objects of the invention is to provide means for relieving the pressure after each operation thereof, so that the compressor will not be required to start against a load or back pressure. To accomplish this object a line is extended from the chamber of the compressor and contains a relief valve which lies adjacent to the aforementioned solenoid and in fact in axial alinement therewith. The seating member or head of the valve extends into physical contact with the armature of the solenoid. The armature, when attracted, bridges a pair of spaced contacts in the circuit of the electric motor. Otherwise, the armature is removed from the contacts by means of a spring. When the solenoid is de-energized by means presently to be described, the armature is displaced by the spring and opens the relief valve to reduce the pressure within the compressor to atmospheric.

Another object of the invention is to provide a means for de-energizing the solenoid and thus opening the driving motor circuit when a given pressure has been reached in a storage tank connected to the exhaust of the compressor. For this purpose a pressure-operated switch is incorporated in the circuit of the solenoid. The pressure side of this switch is connected into the line which joins the compressor to the storage tank. At a given high pressure, the switch opens and renders the solenoid inoperative, so that the compressor motor will not run until the tank pressure drops to a predetermined limit.

The invention is fully disclosed by way of example in the following description and in the accompanying drawings in which:

Figure 1 is a diagrammatic view of the device, showing the circuits;

Figure 6 is a longitudinal section of the compressor and driving motor;

Figure 7 is a section on the line 7—7 of Figure 6, and

Figure 3:
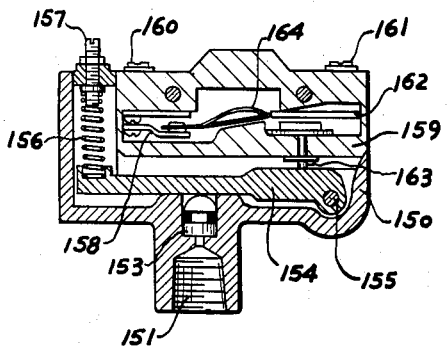
Figure 3 is a section on the line 3—3 of Figure 2.
Figure 2:
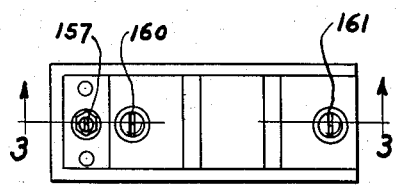
Figure 2 is a plan view of the pressure regulating switch.
Figures 4, 5:
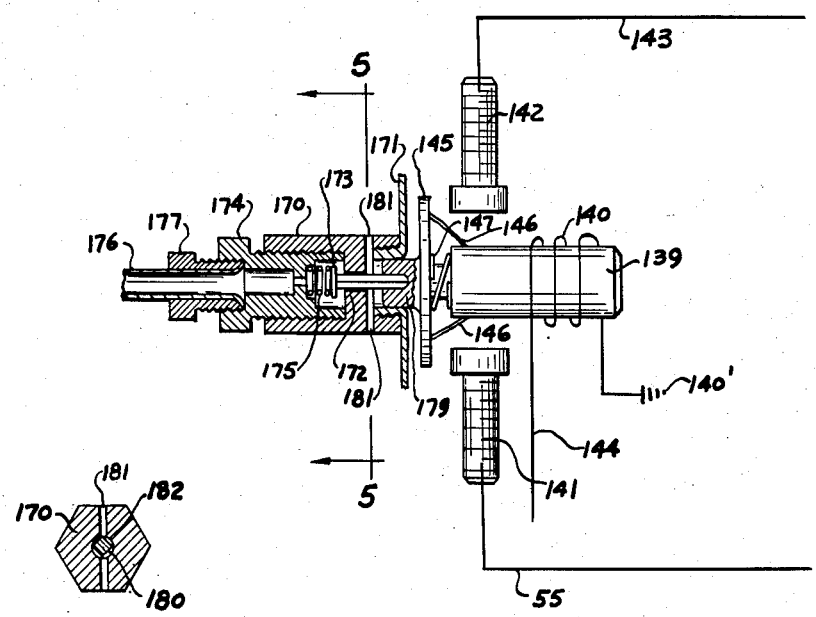
Figure 4 is a longitudinal section of the solenoid switch and pressure relief valve.
Figure 5 is a section on the line 5—5 of Figure 4.

Figures 8 and 9 are sections on the lines 8—8 and 9—9 respectively of Figure 1.

Reference to these views will now be made by use of like characters which are employed to designate corresponding parts throughout.

Air is compressed by a suitable electrically driven compressor 10 operated by an electric motor 11 constructed as shown, for example, in the copending application of Frank M. Stella, Serial No. 80,889, filed March 11, 1949 now Patent No. 2,610,235. The outlet 30 of the compressor is connected to an air storage tank 115 which in turn is connected to the horn or horns 116 by a line 117. In the latter is inserted an electromagnetic valve 118 operated by a grounded button 119.

One side of the motor 11 is grounded at 12, and the other side is connected by a live conductor 55 to the output side of a solenoid switch 120 which will presently be described in detail. The electrical system also includes a conventional generator 121, a battery 122 and a voltage regulator 123 carried on the vehicle.

The terminals of the generator are connected by conductors 124 and 125 respectively to the armature post 126 and field post 127 of the voltage regulator. Battery posts 128 and 129 on the voltage regulator are connected by conductors 130 and 131 respectively to the positive and negative terminals 132 and 133 of the battery. The conductor 124 is grounded through the generator at 121'. The battery terminal 133 is connected by a wire 134 to a terminal 135 of the coil of the valve 118, the other terminal 136 being joined by a conductor 137 to the horn button 119 and the latter being grounded at 119'.

With reference to the solenoid valve in detail, it includes a core 139 surrounded by a coil 140 which is grounded at 140'. At one end of the core are two spaced contacts 141 and 142, the former being joined to the conductor 55 and thus to the motor 11 as previously set forth. A conductor 143 extends from the contact 142 to the battery terminal 129 of the voltage regulator 123.

The armature terminal 126 of the regulator is connected by a conductor 144 to the coil 140. An armature disk 145 is attracted by the energized solenoid to bridge the contacts 141 and 142. The disk is loosely connected to the adjacent end of the core 139 by insulated flexible members 146 and is normally held spaced from the contacts by a spring 147.

The solenoid switch 120 is energized and closed only by current from the generator, in the following manner. The grounded generator 121 when driven by the engine charges the grounded battery 122 through the conductor 125, the usual field (not shown) between the terminals 127 and 128, conductor 130 and grounded battery terminal 132. The running generator energizes the coil 140 through conductor 124, terminal 126, conductor 144 and ground, thus closing the disk 145 on the conductors 141 and 142. Battery current is supplied to the motor 11 from terminal 133, through conductor 131, terminal 129, conductor 143, contact 142, disk 145, contact 141, conductor 55, through the motor and to the ground 12.

The horns 116 are operated on opening of the valve 118. This valve is opened by pushing the button 119 which completes a grounded circuit from battery terminal 133 through conductor 134, posts 135 and 136, and conductor 137.

When the engine is not running, the horns can be blown until the storage tank is exhausted, but the electric motor 11 will not start and thus will not drain the battery, since the closing of the electric motor circuit depends on the running of the generator as above set forth. The generator is always turning over when the engine is running, whether the battery is taking current or not. The electric motor will therefore operate the compressor while the engine and generator are running, regardless of the condition of the battery, except when the electric motor circuit is automatically opened by the means that will presently be described.

At a given pressure in the tank 115, the electric motor circuit is closed, even when the generator is running, by a pressure regulating switch inserted in the conductor 144. The switch is enclosed in an insulating housing 150 having a nipple 151 connected into the line 30 by a pipe T 152. In the nipple is slidably mounted a button 153 adapted to move a spring-pressed arm 154 in the housing 150, the arm having one end pivotally mounted at 155. The free end of the arm is engaged by a coil spring 156 adjusted by a screw 157 mounted in the housing 150. A fixed contact 158 is mounted over a partition 159 in the housing. This contact is connected to a post 160 by means known in the art and therefore not shown. By similar means the other post 161 is connected to a floating arm 162 having one end normally bearing on the contact 158. The posts 160 and 161 are inserted in the conductor 144.

A button 163 slidable in the partition 159 is engaged by the arm 154 and also engages the contact arm 162. On development of a predetermined pressure of about 125 lbs. in the tank 115, the button 153 displaces the arm 154 which in turn moves the button 159. The pressure thus exerted on the contact arm 162 lifts it from the fixed contact 158 through a spring snap action 164 embodied in the arm 162. The conductor 144 is thereby broken, and the solenoid switch 120 cannot be closed to energize the motor 11. The pressure regulating switch is designed to close when the tank pressure drops to 60 to 65 pounds.

This type of switch is known in the art and therefore not described in greater detail.

The invention also includes a pressure release valve for the compressor so that the latter is not called upon to start against a back pressure. A valve housing 170 is suitably attached to an end cap 171 of the solenoid switch housing 120 and in line with the axis of the core 139. The valve housing has a valve seat 172 adapted to be closed by a valve head 173. A fitting 174 is screwed into the housing 172 and retains a spring 175 which holds the head 173 normally on the seat 172. A pipe line 176 is connected to the fitting 174 by a coupling 177 and is also connected into the line 30 at the compressor by a suitable fitting 178.

The disk 145 has a neck 179 extending toward and engaging a stem 180 extending from the head 173. The relief housing 170 is formed with ports 181 positioned between the head 173 and the disk 145.

When the disk 145 is attracted into engagement with the contacts 141 and 142, the spring 175 holds the head 173 seated. When the coil 140 is de-energized, the spring 147 over-balances the spring 175 and pushes the head 173 off its seat. The stem 180 may be a square section operating in a round hole 182, whereby a fluid path is now established from the line 176 to the ports 181.

The compressor chamber is thus relieved down to atmospheric pressure, but not the tank 115 because of a check valve 183 inserted in the line 30 between the compressor and the tank.

The compressor includes a vertical housing 200 with a cap 201 bolted thereon and holding the edge of a diaphragm 202. To a side of the housing 200 is bolted the housing 203 of the motor 11, with an oil seal 204 between the parts. A motor shaft 205 is journalled in ball bearings 206 in the housing 203 and extends through the seal 204 into an external recess 205 in the adjacent side of the housing 200. In this recess the shaft 207 carries a driving pinion 208. A plate 209 is fitted between the housings 200 and 203 and encloses the recess 207 so that the latter is used as an oil chamber. An oil level plug 210 is provided in the lower portion of the plate 209.

In the lower portion of the housing 200 is journalled a crank shaft 211 formed with an eccentric 212 and mounted in ball bearings 213. An oil seal 214 is fitted against the bearing adjacent to the chamber 207. A connecting rod 215 is fitted on the eccentric 212, with a ball bearing 216 between the parts. A clamping ring 217 secures the diaphragm 202 upon the upper end of the connecting rod.

The cap 201 is formed with an intake passage 218 in which is mounted a valve disk 219 closing upwardly against a valve seat 220. A felt air cleaner is fitted in the passage 218 at some distance above the valve seat and is held down by a coil spring 222 which in turn is held by a retaining ring 223 screwed into the passage 218. The ring is covered by a suitable screen 224.

The cap 201 is also formed with an outlet passage 225 in which is also fitted a valve disk 226 closing downward on a valve seat 227. In this passage is screwed a nipple 228 which has a stem 229 extending toward the valve disk but not normally engaging it. A coil spring 230 surrounds the stem and yieldably holds the disk 226 on the seat 227. The base of the nipple 228 is formed with ports 231 to maintain constant communication between the intermediate portion of the passage 225 and the interior of the nipple. The nipple receives the fitting 178 which is connected to the lines 30 and 176 as shown in Figure 1.

What I claim is:

1. In a compressor system, a compressor, an electric motor for driving the same, a conductor for supplying current to said motor and including a pair of spaced contacts, an armature for bridging said contacts, a spring normally holding said armature away from said contacts, a solenoid adapted to attract said armature to said contacts, automatic means for intermittently energizing said solenoid, a fluid line extending from said compressor, a valve body in said line and having a valve seat, a valve head connected to and movable by said armature to close on said seat, said body having an exhaust passage extending from said valve seat and controlled by said valve head, whereby said armature moves said head off said seat when said solenoid is de-energized to connect said compressor through said fluid line and exhaust passage to atmosphere.

2. In a compressor system, a compressor, an electric motor for driving the same, a conductor for supplying current to said motor and including a pair of spaced contacts, an armature for bridging said contacts, a spring normally holding said armature away from said contacts, a solenoid adapted to attract said armature to said contacts, automatic means for intermittently energizing said solenoid, a fluid line extending from said compressor, a valve body in said line and having a valve seat, a valve head adapted to close on said seat, said body having an exhaust passage extending from said valve seat and controlled by said valve head, a rigid connection between said armature and said valve head, whereby said armature moves said head off said seat when said solenoid is deenergized to connect said compressor through said fluid line and exhaust passage to atmosphere.

3. In a compressor system, a compressor, an electric motor for driving the same, a conductor for supplying current to said motor and including a pair of spaced contacts, an armature for bridging said contacts, a spring normally holding said armature away from said contacts, a solenoid adapted to attract said armature to said contacts, a fluid line extending from said compressor, a valve body in said line and having a valve seat, a valve head connected to and movable by said armature to close on said seat, said body having an exhaust passage extending from said valve seat and controlled by said valve head, a rigid connection between said armature and said valve head, whereby said armature moves said head off said seat when said solenoid is de-energized to connect said compressor through said fluid line and exhaust passage to atmosphere, a conductor for supplying current to said solenoid, a normally closed pressure-operated switch in the last named conductor, a tank, a fluid line from the exhaust of said compressor to said tank, said last named switch being connected to said last named line for opening by pressure therein to render said solenoid and motor inoperative.

4. In a compressor system, a compressor, an electric motor for driving the same, a conductor for supplying current to said motor and including a pair of spaced contacts, an armature for bridging said contacts, a spring normally holding said armature away from said contacts, a solenoid adapted to attract said armature to said contacts, a fluid line extending from said compressor, a valve body in said line and having a valve seat, a valve head adapted to close on said seat, said body having an exhaust passage extending from said valve seat and controlled by said valve head, a rigid connection between said armature and said valve head, whereby said armature moves said head off said seat when said solenoid is deenergized to connect said compressor through said fluid line and exhaust passage to atmosphere, a conductor for supplying current to said solenoid, a normally closed pressure-operated switch in the last named conductor, a tank, a fluid line from the exhaust of said compressor to said tank, said last named switch being connected to said last named line for opening by pressure therein to render said solenoid and motor inoperative.

HENRY W. NEFF.

References Cited in the file of this patent

UNITED STATES PATENTS

| Number | Name | Date |
|---|---|---|
| 1,117,394 | Joleen | Nov. 17, 1914 |
| 1,213,815 | Axtell | Jan. 30, 1917 |
| 1,231,662 | Storer | July 3, 1917 |
| 1,315,433 | Tatum | Sept. 9, 1919 |
| 1,358,798 | Tiffin | Nov. 16, 1920 |
| 1,496,510 | Aikman | June 3, 1924 |